(12) United States Patent
McMillen

(10) Patent No.: US 7,490,899 B2
(45) Date of Patent: Feb. 17, 2009

(54) COMBINATION LUMBAR-BOLSTER SYSTEM

(75) Inventor: Robert J. McMillen, Tecsumeh (CA)

(73) Assignee: Schukra of North America, Lakeshore-Tecumseh (CA)

( * ) Notice: Subject to any disclaimer, the term of this patent is extended or adjusted under 35 U.S.C. 154(b) by 0 days.

(21) Appl. No.: 11/694,425

(22) Filed: Mar. 30, 2007

(65) Prior Publication Data

US 2007/0228789 A1    Oct. 4, 2007

Related U.S. Application Data

(60) Provisional application No. 60/787,261, filed on Mar. 30, 2006.

(51) Int. Cl.
*A47C 3/027* (2006.01)

(52) U.S. Cl. .............. 297/284.1; 297/284.3; 297/284.4; 297/284.7; 297/284.8; 297/284.9

(58) Field of Classification Search .............. 297/284.1, 297/284.3, 284.4, 284.7, 284.8, 284.9
See application file for complete search history.

(56) References Cited

U.S. PATENT DOCUMENTS

| | | | |
|---|---|---|---|
| 1,182,854 A | 5/1916 | Poler |
| 1,203,293 A | 10/1916 | Wilkinson |
| 2,274,176 A | 2/1942 | Widman |
| 2,756,809 A | 7/1956 | Endresen |
| 2,833,339 A | 5/1958 | Liljengren |
| 2,843,195 A | 7/1958 | Barvaeus |
| 2,855,984 A | 10/1958 | Majorana et al. |
| 2,922,416 A | 1/1960 | Fader |
| 2,942,651 A | 6/1960 | Binding |
| 3,121,585 A | 2/1964 | Krueger et al. |
| 3,202,453 A | 8/1965 | Richards |
| 3,241,879 A | 3/1966 | Castello et al. |
| 3,246,924 A | 4/1966 | Krueger et al. |
| 3,271,076 A | 9/1966 | Smith |
| 3,273,877 A | 9/1966 | Geller et al. |
| 3,363,941 A | 1/1968 | Wierwille |

(Continued)

FOREIGN PATENT DOCUMENTS

AT    401497    9/1996

(Continued)

OTHER PUBLICATIONS

PCT International Search Report for PCT/CA2007/000523.

*Primary Examiner*—Laurie K Cranmer
(74) *Attorney, Agent, or Firm*—Grant D. Kang; Kang Intellectual Property Law LLC

(57) ABSTRACT

A combination lumbar bolster system for attachment to a vehicle seat frame comprises a lumbar support having a flat position and a deployed position, wherein the deployed position is forward of the flat position; a pair of lateral bolsters each having a resting position and an extended position, wherein the extended position is further from the seat frame than the resting position; at least one traction cable operably attached to at least one of the lumbar support and the lateral bolsters; and at least one spring. The traction cable moves the lumbar support between the flat position and the deployed position and the lateral bolsters between the resting positions and the extended positions such that the movements of the lumbar support and the bolsters is coordinated, and the spring opposes the movement of the traction cable.

4 Claims, 2 Drawing Sheets

U.S. PATENT DOCUMENTS

| | | | |
|---|---|---|---|
| 3,378,299 A | 4/1968 | Sandor | |
| 3,416,839 A | 12/1968 | Flint | |
| 3,490,084 A | 1/1970 | Schuster | |
| 3,492,768 A | 2/1970 | Schuster | |
| 3,550,952 A | 12/1970 | Neale | |
| 3,695,688 A | 10/1972 | Wize | |
| 3,724,144 A | 4/1973 | Schuster | |
| 3,762,769 A | 10/1973 | Poschl | |
| 3,880,463 A | 4/1975 | Shephard et al. | |
| 3,927,911 A | 12/1975 | Rosquist | |
| 3,929,374 A | 12/1975 | Hogan et al. | |
| 3,938,858 A | 2/1976 | Drabert et al. | |
| 3,967,852 A | 7/1976 | Eiselt et al. | |
| 3,983,640 A | 10/1976 | Cardulio et al. | |
| 3,992,059 A | 11/1976 | Kloepfer | |
| 4,014,422 A | 3/1977 | Morishita | |
| 4,040,661 A | 8/1977 | Hogan et al. | |
| 4,105,245 A | 8/1978 | Simons et al. | |
| 4,136,577 A | 1/1979 | Borgersen | |
| 4,153,293 A | 5/1979 | Sheldon | |
| 4,155,592 A | 5/1979 | Tsuda et al. | |
| 4,156,544 A | 5/1979 | Swenson et al. | |
| 4,182,533 A | 1/1980 | Arndt et al. | |
| 4,190,286 A | 2/1980 | Bentley | |
| 4,295,681 A | 10/1981 | Gregory | |
| 4,313,637 A | 2/1982 | Barley | |
| 4,316,631 A | 2/1982 | Lenz et al. | |
| 4,354,709 A | 10/1982 | Schuster | |
| 4,368,916 A | 1/1983 | Blasin | |
| 4,390,210 A | 6/1983 | Wisniewski et al. | |
| 4,428,611 A | 1/1984 | Widmer | |
| 4,449,751 A | 5/1984 | Murphy et al. | |
| 4,452,485 A | 6/1984 | Schuster | |
| 4,465,317 A | 8/1984 | Schwarz | |
| 4,494,709 A | 1/1985 | Takada | |
| 4,519,646 A | 5/1985 | Leitermann et al. | |
| 4,541,670 A | 9/1985 | Morgenstern et al. | |
| 4,555,140 A | 11/1985 | Nemoto | |
| 4,556,251 A | 12/1985 | Takagi | |
| 4,561,606 A | 12/1985 | Sakakibara et al. | |
| 4,564,235 A | 1/1986 | Hatsutta et al. | |
| 4,565,406 A | 1/1986 | Suzuki | |
| 4,576,410 A | 3/1986 | Hattori | |
| 4,601,514 A | 7/1986 | Meiller | |
| 4,602,819 A | 7/1986 | Morel | |
| 4,616,874 A | 10/1986 | Pietsch et al. | |
| 4,619,481 A | 10/1986 | Grudzinskas | |
| 4,627,661 A | 12/1986 | Ronnhult et al. | |
| 4,630,865 A | 12/1986 | Ahs | |
| 4,632,454 A | 12/1986 | Naert | |
| 4,634,083 A | 1/1987 | McKinnon | |
| 4,655,505 A | 4/1987 | Kashiwamura et al. | |
| 4,676,550 A | 6/1987 | Neve De Mevergnies | |
| 4,679,848 A | 7/1987 | Spierings | |
| 4,699,418 A | 10/1987 | Plavetich | |
| 4,707,027 A | 11/1987 | Horvath et al. | |
| 4,711,490 A | 12/1987 | Brand | |
| 4,730,871 A | 3/1988 | Sheldon | |
| 4,768,830 A | 9/1988 | Musselwhite | |
| 4,826,249 A | 5/1989 | Bradbury | |
| 4,833,614 A | 5/1989 | Saitoh et al. | |
| 4,880,271 A | 11/1989 | Graves | |
| 4,909,568 A | 3/1990 | Dal Monte | |
| 4,915,448 A | 4/1990 | Morgenstern | |
| 4,950,032 A | 8/1990 | Nagasaka | |
| 4,957,102 A | 9/1990 | Tan et al. | |
| 4,968,093 A | 11/1990 | Dal Monte | |
| 4,976,104 A | 12/1990 | Morris et al. | |
| 5,005,904 A | 4/1991 | Clemens et al. | |
| 5,022,709 A * | 6/1991 | Marchino | 297/452.24 |
| 5,026,116 A | 6/1991 | Dal Monte | |
| 5,050,930 A | 9/1991 | Schuster et al. | |
| 5,076,643 A | 12/1991 | Colasanti et al. | |
| 5,082,326 A | 1/1992 | Sekido et al. | |
| 5,088,790 A | 2/1992 | Wainwright et al. | |
| 5,092,654 A | 3/1992 | Inaba et al. | |
| 5,112,106 A | 5/1992 | Asbjornsen et al. | |
| 5,120,111 A | 6/1992 | Cook | |
| 5,137,329 A | 8/1992 | Neale | |
| 5,174,526 A | 12/1992 | Kanigowski | |
| 5,186,412 A | 2/1993 | Park | |
| 5,195,795 A | 3/1993 | Cannera et al. | |
| 5,197,780 A | 3/1993 | Coughlin | |
| 5,215,350 A | 6/1993 | Kato | |
| 5,217,278 A | 6/1993 | Harrison et al. | |
| 5,269,581 A | 12/1993 | Okagaki et al. | |
| 5,286,087 A | 2/1994 | Elton | |
| 5,292,175 A | 3/1994 | Artz | |
| 5,292,176 A | 3/1994 | Artz | |
| 5,299,851 A | 4/1994 | Lin | |
| 5,316,371 A | 5/1994 | Bishai | |
| 5,335,965 A | 8/1994 | Sessini | |
| 5,368,355 A | 11/1994 | Hayden et al. | |
| 5,385,389 A | 1/1995 | Bishai | |
| 5,385,531 A | 1/1995 | Jover | |
| 5,397,164 A | 3/1995 | Schuster et al. | |
| 5,397,167 A | 3/1995 | Fourrey et al. | |
| 5,423,593 A | 6/1995 | Nagashima | |
| 5,449,219 A | 9/1995 | Hay et al. | |
| 5,452,868 A | 9/1995 | Kanigowski | |
| 5,472,261 A | 12/1995 | Oplenskdal et al. | |
| 5,474,358 A | 12/1995 | Maeyaert | |
| 5,482,346 A | 1/1996 | Lesourd | |
| 5,498,063 A | 3/1996 | Schuster et al. | |
| 5,505,520 A | 4/1996 | Frusti et al. | |
| 5,518,294 A | 5/1996 | Ligon, Sr. et al. | |
| 5,529,377 A | 6/1996 | Miller | |
| 5,553,917 A | 9/1996 | Adat et al. | |
| 5,562,324 A | 10/1996 | Massara et al. | |
| 5,567,010 A | 10/1996 | Sparks | |
| 5,567,011 A | 10/1996 | Sessini | |
| 5,570,931 A | 11/1996 | Kargilis et al. | |
| 5,588,703 A | 12/1996 | Itou | |
| 5,588,707 A | 12/1996 | Bolsworth et al. | |
| 5,609,394 A | 3/1997 | Ligon, Sr. et al. | |
| 5,626,390 A | 5/1997 | Schuster et al. | |
| 5,638,722 A | 6/1997 | Klingler | |
| 5,651,583 A | 7/1997 | Klingler et al. | |
| 5,651,584 A | 7/1997 | Chenot et al. | |
| 5,660,438 A | 8/1997 | Tedesco | |
| 5,681,079 A | 10/1997 | Robinson | |
| 5,704,687 A | 1/1998 | Klingler | |
| 5,716,098 A | 2/1998 | Lance | |
| 5,718,476 A | 2/1998 | De Pascal et al. | |
| 5,730,495 A | 3/1998 | Tuman, II | |
| 5,758,925 A | 6/1998 | Schrewe et al. | |
| 5,762,397 A | 6/1998 | Venuto et al. | |
| 5,769,490 A | 6/1998 | Falzon | |
| 5,769,491 A | 6/1998 | Schwarzbich | |
| 5,772,281 A | 6/1998 | Massara | |
| 5,775,773 A | 7/1998 | Schuster et al. | |
| 5,791,733 A | 8/1998 | Van Hekken et al. | |
| 5,816,653 A | 10/1998 | Benson | |
| 5,823,620 A | 10/1998 | Le Caz | |
| 5,857,743 A | 1/1999 | Ligon, Sr. et al. | |
| 5,868,466 A | 2/1999 | Massara et al. | |
| 5,884,968 A | 3/1999 | Massara | |
| 5,897,168 A | 4/1999 | Bartelt et al. | |
| 5,911,477 A | 6/1999 | Mundell et al. | |
| 5,913,569 A | 6/1999 | Klingler | |
| 5,934,752 A | 8/1999 | Klingler | |
| 5,941,602 A | 8/1999 | Sturt et al. | |
| 5,967,608 A | 10/1999 | Van Sickle | |
| 5,975,632 A | 11/1999 | Ginat | |

| | | | | | | |
|---|---|---|---|---|---|---|
| 5,984,407 | A | 11/1999 | Ligon, Sr. et al. | 7,140,680 B2 * | 11/2006 | McMillen et al. ........ 297/284.9 |
| 5,988,745 | A | 11/1999 | Deceuninck | 7,140,681 B2 * | 11/2006 | McMillen et al. ........ 297/284.9 |
| 6,003,941 | A | 12/1999 | Schuster, Sr. et al. | 7,328,950 B2 * | 2/2008 | McMillen et al. ........ 297/284.4 |
| 6,007,151 | A | 12/1999 | Benson | 2003/0071501 A1 | 4/2003 | Cruz Fernandes De Pinho |
| 6,030,041 | A | 2/2000 | Hsiao | 2003/0085600 A1 | 5/2003 | Mori |
| 6,036,265 | A | 3/2000 | Cosentino | 2004/0108760 A1 | 6/2004 | McMillen |
| 6,045,185 | A | 4/2000 | Ligon, Sr. et al. | 2005/0017555 A1 | 1/2005 | Elliot |
| 6,050,641 | A | 4/2000 | Benson | 2006/0261653 A1 * | 11/2006 | McMillen et al. ........ 297/284.4 |
| 6,079,783 | A | 6/2000 | Schuster, Sr. et al. | 2007/0063561 A1 * | 3/2007 | McMillen ................ 297/284.8 |
| 6,089,664 | A | 7/2000 | Yoshida | | | |
| 6,092,871 | A | 7/2000 | Beaulieu | | | |

FOREIGN PATENT DOCUMENTS

| | | |
|---|---|---|
| DE | 204794 | 7/1971 |
| DE | 2064419 | 7/1972 |
| DE | 2947472 A1 | 8/1980 |
| DE | 3616155 A1 | 11/1987 |
| DE | 3624396 A1 | 1/1988 |
| DE | 42020995 A1 | 1/1994 |
| DE | 19750116 A1 | 5/1999 |
| DE | 10005215 C1 | 9/2001 |
| DE | 20107424 U1 | 11/2001 |
| EP | 0006840 B1 | 2/1982 |
| EP | 0169293 B1 | 10/1988 |
| EP | 0296938 A1 | 12/1988 |
| EP | 0322535 A1 | 7/1989 |
| EP | 0563709 A3 | 10/1993 |
| EP | 0485483 B1 | 1/1994 |
| EP | 0434660 B1 | 5/1995 |
| EP | 0540481 B1 | 12/1995 |
| EP | 0662795 B1 | 12/1996 |
| EP | 0702522 B1 | 3/1997 |
| EP | 0696251 B1 | 7/1997 |
| EP | 0746219 B1 | 11/1998 |
| EP | 0797399 B1 | 11/1998 |
| EP | 0698360 B1 | 3/2000 |
| EP | 1046539 A1 | 10/2000 |
| FR | 2596334 A1 | 10/1987 |
| GB | 849798 | 9/1960 |
| GB | 1423617 | 2/1976 |
| GB | 2013487 A | 8/1979 |
| GB | 2059497 A | 4/1981 |
| SU | 587924 | 2/1978 |
| WO | WO/00/00064 | 1/2000 |
| WO | WO 03/022626 A1 | 3/2003 |
| WO | WO 2004/043207 A2 | 5/2004 |
| WO | WO 2004/043730 A2 | 5/2004 |

| | | | |
|---|---|---|---|
| 6,129,419 | A | 10/2000 | Neale |
| 6,139,102 | A | 10/2000 | Von Möller |
| 6,152,531 | A | 11/2000 | Deceuninck |
| 6,152,532 | A | 11/2000 | Cosentino |
| 6,158,300 | A | 12/2000 | Klingler |
| 6,174,017 | B1 | 1/2001 | Salani et al. |
| 6,199,951 | B1 | 3/2001 | Zeite et al. |
| 6,227,617 | B1 | 5/2001 | Von Möller |
| 6,227,618 | B1 | 5/2001 | Ligon, Sr. et al. |
| 6,254,186 | B1 | 7/2001 | Falzon |
| 6,254,187 | B1 | 7/2001 | Schuster, Sr. et al. |
| 6,270,158 | B1 | 8/2001 | Hong |
| 6,296,308 | B1 | 10/2001 | Cosentino et al. |
| 6,334,651 | B1 | 1/2002 | Duan et al. |
| 6,338,530 | B1 | 1/2002 | Gowing |
| 6,364,414 | B1 | 4/2002 | Specht |
| 6,371,558 | B1 | 4/2002 | Couasnon |
| 6,375,255 | B1 | 4/2002 | Maruta et al. |
| 6,430,801 | B1 | 8/2002 | Cosentino |
| 6,499,803 | B2 * | 12/2002 | Nakane et al. ........... 297/284.4 |
| 6,520,580 | B1 | 2/2003 | Hong |
| 6,536,840 | B1 | 3/2003 | Schuster, Sr. et al. |
| 6,554,360 | B1 | 4/2003 | Wilke et al. |
| 6,616,227 | B2 | 9/2003 | Blendea et al. |
| 6,634,046 | B2 | 10/2003 | Schuster |
| 6,644,740 | B2 | 11/2003 | Holst et al. |
| 6,652,029 | B2 | 11/2003 | McMillen |
| 6,655,738 | B2 | 12/2003 | Kammerer |
| 6,666,511 | B2 | 12/2003 | Schuster et al. |
| 6,669,299 | B2 | 12/2003 | Carlson et al. |
| 6,676,214 | B2 | 1/2004 | McMillen et al. |
| 6,682,144 | B2 | 1/2004 | Klingler |
| 6,736,459 | B1 | 5/2004 | Sturt |
| 6,860,561 | B2 | 3/2005 | Takata |
| 6,908,152 | B2 | 6/2005 | McMillen |
| 7,000,986 | B2 | 2/2006 | Cruz Fernandes de Pinho |

* cited by examiner

COMBINATION LUMBAR-BOLSTER SYSTEM

CROSS-REFERENCE TO RELATED APPLICATIONS

None.

BACKGROUND OF THE INVENTION

1. Field of the Invention

The present invention relates to lumbar supports and lateral bolsters for vehicle seats.

2. Related Art

What is needed is a simpler seat comfort feature design that enables all comfort features for the seat back or seat base to be supplied as a single modular component. This component needs to be lightweight yet comfortable and durable and capable of adding on multiple seat comfort options. Ideally the component would easily adapt to numerous types of vehicle seat designs with little or no adaptation required.

The invention disclosed herein is designed to solve one or more of the above-identified problems.

SUMMARY OF THE INVENTION

In one aspect a combination lumbar bolster system for attachment to a vehicle seat frame comprises a lumbar support having a flat position and a deployed position, wherein the deployed position is forward of the flat position; a pair of lateral bolsters each having a resting position and an extended position, wherein the extended position is further from the seat frame than the resting position; at least one traction cable operably attached to at least one of the lumbar support and the lateral bolsters; and at least one spring. The traction cable moves the lumbar support between the flat position and the deployed position and the lateral bolsters between the resting positions and the extended positions such that the movements of the lumbar support and the bolsters is coordinated, and the spring opposes the movement of the traction cable.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
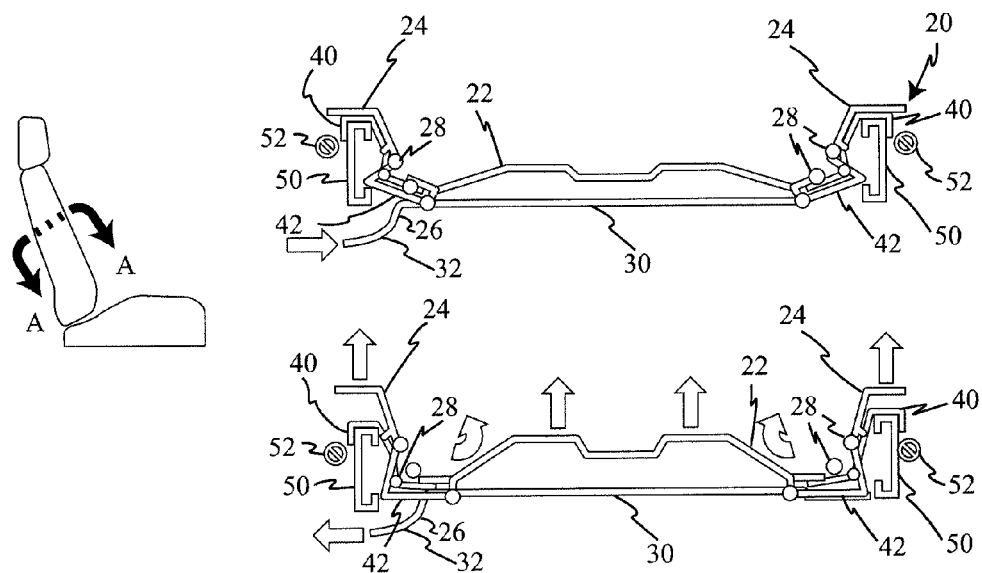
FIG. 1 shows an example of a pivot embodiment of a combination lumbar-bolster system.

The following description of the preferred embodiment(s) is merely exemplary in nature and is in no way intended to limit the invention, its application, or uses.

In general a combined lumbar-bolster system, shown generally at 20, comprises a method and apparatus for simultaneously adjusting both a lumbar support 22 and a pair of adjacent lateral bolsters 24. The movement of the lumbar support 22 and the bolsters 24 is coordinated such that movement of the lumbar support 22 from its full-flat position to its full-out position is accompanied by proportional amount of travel of the lateral bolsters 24.

In some embodiments the lumbar support 22 arches as it moves to its full-out position while in other embodiments the lumbar support 22 retains approximately the same shape but moves forward. In certain embodiments the lateral bolsters 24 move forward as the lumbar 22 is deployed into its full-out position while in other embodiments the lateral bolsters 24 move inward toward the centerline CL of the seat.

In the various embodiments disclosed herein the movement of the lumbar 22 and bolsters 24 is driven by one or more traction or Bowden cables 26. In the disclosed embodiments, the pulling action of the traction cables 26 is opposed by one or more springs 28. The springs 28 may be compression springs or tension springs, depending on the configuration.

Depending on the particular embodiment, the lumbar support 22 and bolsters 24 may be made as a single piece of material, generally with the lumbar 22 and bolsters 24 attached to one another via hinged portions. Alternatively, the lumbar 22 and bolsters 24 may be made as separate pieces.

In one embodiment the lumbar support 22 and bolsters 24 are made of molded plastic, while in other embodiment these components are made of stamped sheet metal, although any suitable material known to those skilled in the art is encompassed within the scope of the invention. In one embodiment the lumbar supports 22 and bolsters 24 are covered with padding, which in some embodiments comprises foam that is directly molded onto the components, and then the padded surfaces are covered with seat trim material such as cloth or leather.

To provide additional structural support and to facilitate necessary functional requirements, the lumbar support 22 and bolsters 24 may be underlain with support wires or rods as depicted. Ultimately the combination lumbar-bolster system 20 is attached to the seat frame 50, with this attachment generally being mediated by the underlying support wire. In this manner the combination lumbar-bolster system 20 can be provided as a modular seat comfort system that is simpler and less expensive to manufacture and assemble than systems based on multiple separate components.

By 'bolster' what is meant is a pad or other ergonomic device attached at the lateral edge of a seat back or seat base. A bolster 24 may be stationary or it may be dynamically adjustable. A bolster 24 typically projects outward or forward relative to the plane of the seat such that the bolster helps to support and stabilize a seat occupant's back or rib cage (in the case of a bolster on a seat back) or thigh region (in the case of a bolster on a seat base). Typically bolsters are mounted symmetrically on the seat back or seat base or both and typically run the full length of the respective cushion component, although in some cases the bolsters 24 may not have a uniform thickness, density, or profile along the full length. For example in some cases the bolster 24 projects further forward near the lower end of a seat back, or may project further upward at the front edge of a seat base.

The embodiments disclosed herein employ what is referred to as a 'traction cable' and is sometimes referred to as a 'Bowden cable.' By 'traction cable' what is meant is a wire 30 slidingly disposed within an axial location within a relatively non-compressible sleeve 32, wherein the wire 30 protrudes from the sleeve 32 at each end. At one end of the sleeve the wire 30 and sleeve 32 are engaged with an actuator 52 which causes the wire 30 to move with respect to the sleeve 32. Typically the wire 30 can only generate tension by pulling, since the cable is relatively flexible. However, in some embodiments a push-pull cable 30 might also be used, wherein the axially disposed wire 30 is stiffer and is capable of generating outward pushing forces. Nonetheless the cable 30 is flexible enough to bend, thereby permitting pulling or pushing forces to be transmitted to remote locations in a non-linear path. Generating or increasing tension on a cable 26 means pulling the axial wire 30 using the actuator 52 toward the end with the actuator 52. This has the effect of either shortening the effective, exposed length of the wire 30 at the opposite end of the cable, if the circumstances permit, or perhaps increasing tension on the wire 30 without changing the effective length if the device to which the wire 30 is attached cannot move any further.

Pivot Design Embodiment:

In one embodiment a combination lumbar-bolster system 20 comprises a lumbar support 22 that is operatively attached near one lateral edge to a traction cable wire 26 and near an opposite lateral edge to a traction cable sleeve 32, as seen in FIG. 1. Shortening of the traction cable wire 30 by the wire's being pulled into the sleeve 32 causes the two sides of the lumbar support 22 to be pulled closer together. This in turn causes the lumbar support 22 to bow outward or arch. Since the lateral edges of the lumbar support 22 are pulled together and the center of the support arches, it follows that the lumbar support 22 pivots at its edges at the points of attachment of the traction cable 26.

In one embodiment the sides of the lumbar support 22 are also operatively attached to a pair of lateral bolsters 24 via a series of hinged extension pieces. One of the extension pieces rests against a support wire 40 such that as the extension pieces are drawn together the hinged extension pieces 42 pivot against the support wire 40, causing the lateral bolsters 24 to project forward relative to the underlying seat frame 50. In some embodiments the bolsters 24 and extensions 42 are slidingly attached to the support wire 40. In one embodiment the lumbar support region, the extension pieces 42, and the lateral bolster 24 are fabricated as a single piece of material.

The pulling of the traction cable wire 30, the bowing or arching of the lumbar support 22, and the forward movement of the bolsters 24 are in one embodiment all opposed by one or more return springs 28. In one embodiment a return spring 28 is fixedly attached at a first end to a lateral aspect of the lumbar support 22 and a second end of the spring 28 is attached to a hinge region between the bolster 24 and the extension.

In a preferred embodiment the first end of the spring 28 is attached to a point on the lumbar support 22 that is near the edge whereas the traction cable wire 30 and sleeve 32 are attached a short distance away from the lateral edge. In this manner the edge region of the lumbar support 24 will pivot about the points of attachment to the traction cable 26 such that the lateral edge of the lumbar support 24 will move in a cantilevered manner, increasing the leverage of and enhancing the return action of the spring 28.

Figure 2:
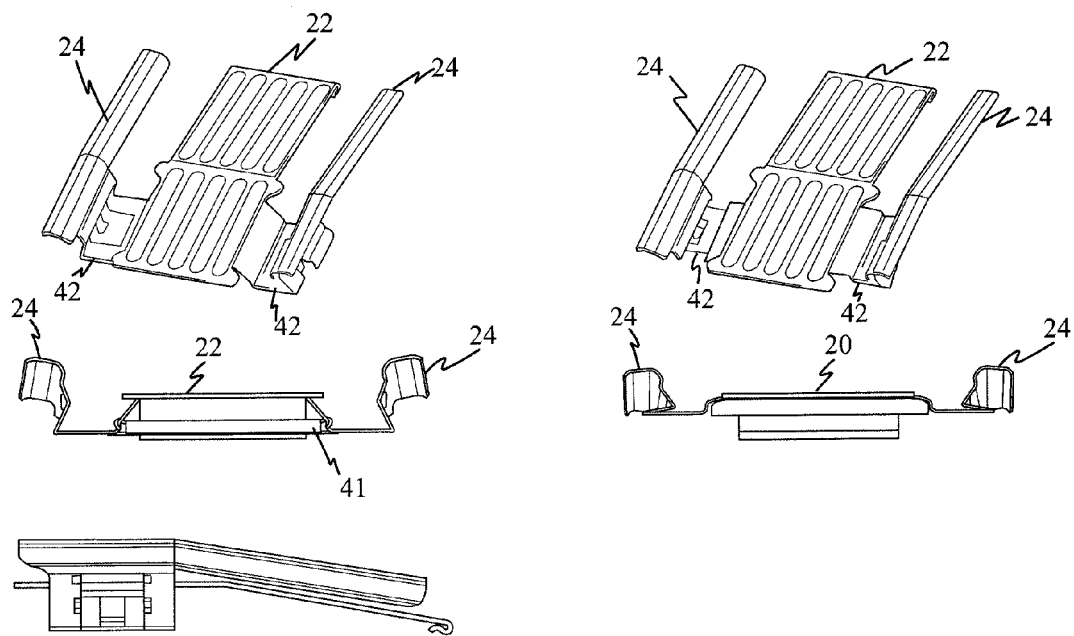
FIG. 2 shows a second example of a pivot embodiment of a combination lumbar-bolster system.

In a variant on this embodiment, in FIG. 2, the extension pieces that are directly adjacent the lumbar support are hinged and a tension spring 41 is attached between these hinged pieces. When tension on the traction cable wire (omitted in FIG. 2) is decreased, the tension spring 41 draws the hinged pieces together towards the centerline, causing the lumbar support 22 to project forward. At the same time, the adjacent hinged pieces 42 are drawn towards the center and through a lever action cause the lateral bolster 24 sections to move forward.

To move the lumbar support 22 and lateral bolsters 24 rearward, one or more traction cables 26 are used to pull on the hinged portions 42 that are directly adjacent the lumbar support 22 in a lateral direction. In one embodiment a traction cable wire (omitted in FIG. 2) is attached near the attachment point of each end of the spring 28, and the traction cable sleeve (omitted in FIG. 2) is attached to the seat frame 50 or other laterally-disposed fixed point.

This Lumbar Bolster system 20 embodiment is driven together using a one piece basket with multiple hinged zones to create a centered Lumbar position and outside Bolster Support with a single driver.

There are many advantages to this embodiment: the lumbar-bolster system 20 can be provided as a single module; a single traction cable 26 can be used to drive the system; the lumbar 22 and bolsters 24 can be manufactured as a single piece of material, for example plastic; when deployed the lumbar-bolster combination 'hugs' the seat occupant's midsection for greater support and comfort; and a pulley-type actuator 52 can be used for mechanical advantage.

In the pivoting embodiments, the trim material underlying padding such as foam will need to be flexible across the back frame 50 to minimize the cable loads.

Figure 3:
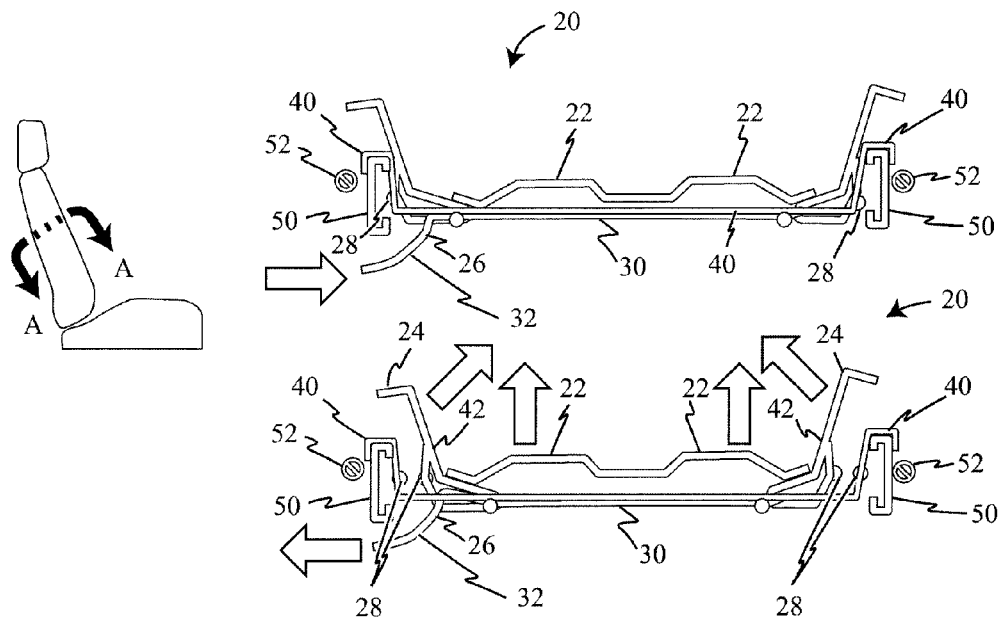
FIG. 3 shows an example of a ramping embodiment of a combination lumbar-bolster system.

Ramp Design Embodiment:

In another embodiment of a combination lumbar-bolster system 20 shown in FIG. 3, the lumbar support 22 and the two lateral bolsters 24 are separate pieces. In general this embodiment encompasses the lateral bolsters 24 creating a ramp-like structure on which the lumbar support 22 can ride, such that the lumbar support 22 is pushed forward as the lateral bolsters 24 are pulled towards one another. To this end, in one embodiment the lateral edges of the lumbar support 22 are angled forward in a manner complementary to the ramps on the medial edges of the lateral bolsters 24. In this embodiment the traction cable wire 30 and sleeve end 32 are fixedly attached to each of the lateral bolsters 24 respectively. The lateral bolsters 24 are slidingly attached to at least one support wire 40 that runs between the two lateral aspects of the seat frame 50. The lumbar support 22 is held in place independently of the lateral bolsters 24, although the lumbar support 22 nonetheless has sufficient freedom of movement to allow it to move forward and backward in response to movement of the lateral bolsters 24.

In practice, to move the lumbar support 22 forward the traction cable wire 30 is pulled at a distal end relative to the sleeve 32 so that the effective, exposed length of the wire 30 is reduced, thereby drawing the lateral bolsters 24 closer toward the centerline of the seat. Since the lateral bolsters 24 have ramped portions on them and the lumbar support 22 has complementary ramped portions on its lateral edges that are in contact with the ramped portions of the bolsters 24, drawing together of the bolsters 24 causes the lumbar support 22 to move forward. Releasing tension on the traction cable wire 30 leads to an increase in the effective, exposed length thereby permitting the bolsters 24 to move away from one another.

To facilitate return of the lateral bolsters 24 to their lateral starting positions closer to the seat frame 50, a return spring 28 is included on each side. A first end of the return spring 28 is attached to a fixed point such as a support wire 40 and a second end of the spring 28 is attached to the lateral bolster 24. When the traction cable wire 30 pulls on the bolsters 24, this pulling action is opposed by the return springs 28. Releasing tension on the traction cable wire 30 permits the springs 28 to pull the bolsters 24 in a lateral direction. In this embodiment of a combination lumbar-bolster system 20 the lateral bolsters 24 move inward at the same time the lumbar support 22 moves forward, but the bolsters 24 do not move forward themselves. Also, in this embodiment the lumbar support 22 is substantially the same shape as it moves forward and does not bow or arch forward.

This Lumbar Bolster system 20 is driven together using two outside ramps that drive the center pad forward to create a centered Lumbar position and outside Bolster Support with a single driven.

There are many advantages to this embodiment: the lumbar-bolster system 20 can be provided as a single module; a single traction cable 26 can be used to drive the system; when deployed the lumbar-bolster combination 'hugs' the seat occupant's midsection for greater support and comfort; and a pulley-type actuator 52 can be used for mechanical advantage.

In the ramping embodiments, the trim material underlying padding such as foam will need to be flexible across the back frame 50 to minimize the cable loads.

Figure 4:
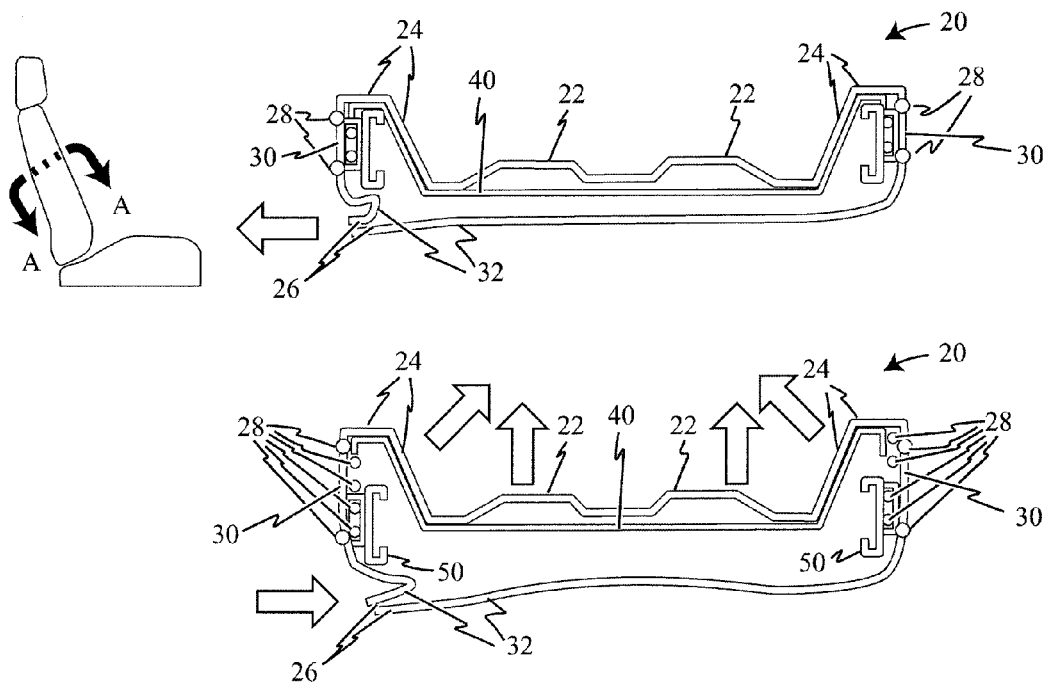
FIG. 4 shows an example of a spring embodiment of a combination lumbar-bolster system.

Spring Design Embodiment:

According to FIG. 4, in yet another embodiment of a combination lumbar-bolster system 20 the lumbar support 22 and lateral bolsters 24 are present as a single piece of material, referred to hereinafter as a lumbar-bolster. In this embodiment the lumbar-bolster 22, 24 rests against a support wire 40 and the support wire 40 is moved forward and backward relative to the seat frame 50. The lumbar-bolster 22, 24 is pushed forward by one or more compression springs 28. In one embodiment there is a compression spring 28 on each side of the seat frame 50, with a first end of each spring pushing against a bracket 44 that is firmly attached to the seat frame 50 and a second end of the spring pushing against the support wire 40 in the lateral bolster 24 region.

The action of the compression springs 28 is opposed by a pair of laterally displaced traction cables 26. In one embodiment a first traction cable sleeve 32 is attached to a fixed point such as a first bracket against which the first end of the spring 28 pushes, wherein the bracket is firmly attached to the seat frame 50. A first traction cable wire 30 is firmly attached to a lateral aspect of the lumbar-bolster 22, 24. Similarly, on the opposite side of the seat frame 50 a second sleeve 30 is attached to a second bracket and a second wire 30 is attached to a second, opposite lateral aspect of the lumbar-bolster device. When there is no tension on the traction cables 26 the wires 30 are allowed to extend outward, permitting the lumbar-bolster 22, 24 to move as far forward as the compression springs 28 will push. When tension on the wires 30 is increased the wires 30 slide into the sleeve 32, shortening the effective length relative to the sleeve 32, thereby pulling the end of the wire 30 closer to the end of the sleeve 32 and pulling the lumbar-bolster 22, 24 rearwards. In this embodiment the lumbar support 22 has approximately the same shape whether in the forward or rearward position.

This Lumbar Bolster system is driven upward by compression springs 28 supporting the Lumbar and outside Bolster regions. The system is pulled back by dual cables.

There are many advantages to this embodiment: the lumbar-bolster system 20 can be provided as a single module; the lumbar 22 and bolsters 24 can be manufactured as a single piece of material, for example plastic; when deployed the lumbar-bolster 22, 24 combination 'hugs' the seat occupant's midsection for greater support and comfort; and the use of compression springs 28 gives a spring cushion feel across the lumbar region.

In the spring embodiments, the trim material underlying padding such as foam will need to be flexible across the back frame 50 to minimize the cable loads.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A combination lumbar bolster system for attachment to a vehicle seat frame, comprising:
    a lumbar support for supporting a lumbar of a seat occupant, said lumbar support having a flat position and a deployed position, wherein the deployed position is forward of the flat position;
    a pair of lateral bolsters each having a resting position and an extended position, wherein the extended position is further from the seat frame than the resting position;
    at least one traction cable operably attached to at least one of the lumbar support and the lateral bolsters;
    at least one spring;
    wherein the traction cable moves the lumbar support between the flat position and the deployed position and the lateral bolsters between the resting positions and the extended positions such that the movements of the lumbar support and the bolsters are coordinated;
    wherein the at least one spring opposes the movement of the traction cable.

2. The combination lumbar bolster system of claim 1 wherein the lumbar support and lateral bolsters are made of a single piece of material.

3. The combination lumbar bolster system of claim 2 wherein the lumbar support and lateral bolsters are hingedly attached to one another by at least one extension piece.

4. The combination lumbar bolster system of claim 1 further comprising a support wire, wherein the support wire attaches the lumbar support and bolsters to said seat frame.

* * * * *